Jan. 18, 1927. 1,615,052

R. C. STUBBS

VIBRATING MACHINE

Filed Nov. 21, 1925

Inventor
ROBERT C. STUBBS

By A. L. Jackson
Attorney

UNITED STATES PATENT OFFICE.

ROBERT C. STUBBS, OF DALLAS, TEXAS.

VIBRATING MACHINE.

Application filed November 21, 1925. Serial No. 70,511.

My invention relates to vibrating machines and more particularly to vibrating machines for solidifying concrete structures, such as paving for streets, roads and the like; and the object is to provide out-of-balancing devices for increasing the vibrations or decreasing the vibrations per minute and for holding the out-of-balancing devices at whatever position or point of adjustment that may be required on the work to be done. Other objects and advantages will be fully explained in the following description and the invention will be more particularly pointed out in the claims.

Reference is had to the accompanying drawings which form a part of this application.

Similar characters of reference are used to indicate the same parts throughout the several views.

Figure 1:
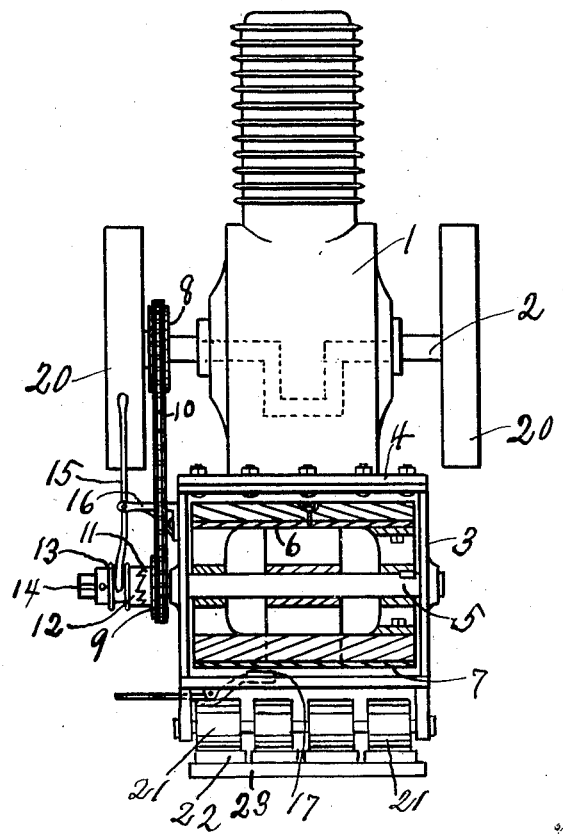
Fig. 1 is a front elevation of a vibrating machine provided with the out-of-balancing devices shown in section.
Figure 2:
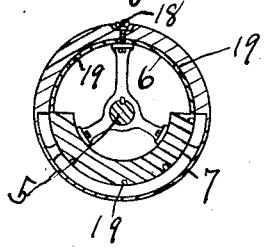
Fig. 2 is a cross-section of the out-of-balancing cylinders, showing the weighted or heavy sides of the two cylinders in perfect balance.
Figure 3:
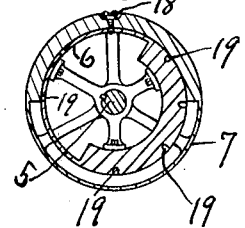
Fig. 3 is a similar view, but showing the heavy sides of the cylinders shifted to out-of-balance positions.
Figure 4:
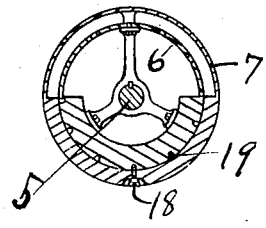
Fig. 4 is a similar view, but showing both heavy sides adjacent to each other for creating the maximum out-of-balance force, the centrifugal force of both heavy sides pulling in the same direction.

The drawings show a motor provided with a crank-case 1 in which is journaled a crank-shaft 2 which is to be driven by the motor. A rectangular frame 3 is rigidly attached to the motor base 4. A shaft 5 is journaled in the frame 3 for the out-of-balancing cylinders 6 and 7. The inner cylinder 6 may be keyed or otherwise made rigid with the shaft 5. Sprocket wheels 8 and 9 are rigid respectively with the shafts 2 and 5. A chain 10 is mounted on the wheels 8 and 9 so that the motor driven wheel 8 will drive the chain 10 for driving the wheel 9 and shaft 5. In operation, the wheel 9 is rigid with the shaft 5. The wheel 9 is loosely mounted on the shaft 5 and is made rigid therewith by clutch members. The clutch member 11 is formed on the hub of wheel 9 and the clutch member 12 is formed on a sleeve which carries a collar 13. The collar 13 is slidably mounted on the shaft 5 by a lug which operates in a slot 14 in the shaft so that the clutch member 12 must rotate with the shaft 5. The clutch is thrown in and out of mesh by lever 15 which is provided with a fulcrum 16 which is mounted on the casing or frame 3. A friction clutch 17 may be fulcrumed on the frame 3 for bearing against the periphery of the cylinder 7 for causing the cylinder 7 to run slower or stop as soon as required.

The cylinders 6 and 7 may be locked together by a set screw 18 which is countersunk in the periphery of the cylinder 7. The cylinder 6 may be provided with a plurality of screw sockets 19 for the screw 18. The cylinders 6 and 7 are driven from the shaft 2 which is provided with balance wheels 20. Approximately one half of each cylinder, 6 and 7, is weighted by making one-half of the circumferential area thicker from one end to end than the other half. The object is to make the cylinders of approximately the same weight and to make the heavy side of the inner cylinder equal in weight to the heavy side of the outer cylinder and to make the light side of the inner cylinder equal in weight to the light side of the outer cylinder. The outer cylinder may be held stationary while the inner cylinder revolves if desirable. This may be done by removing the screw 18 and applying the friction brake 17. This would accomplish an out-of-balance effect, but the out-of-balance effect is or may be generally accomplished by a shifting of the light and heavy sides of the cylinders relative to each other. The cylinders can be held at any desired points of adjustment by the screw 18 and the sockets 19. The effect of the out-of-balance elements is to create vibrations and the vibrations will be transmitted through the frame to rollers 21 and the rollers 21 will transmit the vibrations to the transmission unit which consists of stringers 22 to which are attached cleats 23. The cleats 23 and the stringers 22 make a platform for pressing the concrete or other plastic down and there must be sufficient spaces between the several strips and cleats to permit the air and surplus moisture or mortar to escape while the mass is being vibrated by the machine and the weight of the entire machine furnishes the necessary pressure.

What I claim, is,—

1. In a vibrating machine provided with a driven shaft and balance wheels thereon;

a vibrating element consisting of a shaft, bearings for said shaft rigid with the vibrating machine, an inner cylinder rigid with said transmitting shaft and having a heavy side and a light side, an outer cylinder mounted on said inner cylinder and means for detachably connecting the outer cylinder to said inner cylinder, said outer cylinder having a light side and a heavy side, and means for driving said transmitting shaft from said driven shaft.

2. In a vibrating machine provided with a driven crank shaft and balance wheels thereon; a vibrating element consisting of a shaft and bearings therefor rigid with the vibrating machine, an inner cylinder rigid therewith and having a heavy side and a light side, an outer cylinder having a heavy side and a light side mounted on said inner cylinder, means for detachably and adjustably connecting the outer cylinder to the inner cylinder, means for driving said vibrating shaft from said crank shaft, and means for transmitting the vibrations of said shaft to mass of material to be solidified as it is compacted.

3. In a vibrating machine provided with a driven crank shaft and balance wheels thereon; an out-of-balance element for creating vibrations consisting of inner and outer cylinders movable peripherally relative to each other and each having a heavy side and a light side, means for driving said element from said shaft, and means for transmitting the vibrations from said vibrating element to the mass of material to be compacted and solidified.

4. In a vibrating machine provided with a frame and a driven shaft journaled in said frame; an out-of-balance element for creating vibrations consisting of inner and outer cylinders, each provided with heavy and light sides, and a shaft rigid with said inner cylinder, said outer cylinder being shiftable peripherally relative to said inner cylinder and detachably connected thereto, means for driving said vibrating shaft from said driven shaft, and means for transmitting the vibrations from said shaft to the mass of material to be compacted and solidified.

5. In a vibrating machine provided with a frame and a driven shaft journaled in said frame; an out-of-balance element for creating vibrations consisting of inner and outer cylinders shiftable peripherally relatively to each other and provided with light and heavy sides, means for detachably connecting said cylinders to each other, a shaft for said cylinders adapted to be driven from said driven shaft, gearing for operatively connecting said shafts for operating purposes, and means for transmiittng the vibrations of said vibrating shaft to the material to be compacted and solidified.

6. In a vibrating machine provided with a driven crank shaft and balance wheels thereon; an out-of-balance element for creating vibrations consisting of inner and outer cylinders of approximaetly equal weight and each having a periphery of unbalanced sides, and means operatively connected to said balance wheels and to said out-of-balance element for driving the latter.

7. In a vibrating machine provided with a frame and a driven crank shaft and balance wheels thereon; an out-of-balance element for creating vibrations in said frame, means for actuating said out-of-balance elements from said wheels, and means for transmitting the vibrations of said frame to the mass of material to be compacted and solidified.

8. In a vibrating machine provided with a frame and a driven crank shaft and balance wheels thereon; an out-of-balance element for creating vibrations in said frame, means interposed between said out-of-balance element and said shaft and actuated by said shaft for operating said element, and means for transmitting the vibrations of said frame to the mass of material to be compacted and solidified.

In testimony whereof, I set my hand this 20th day of June, 1925.

ROBERT C. STUBBS.